United States Patent
Wagner et al.

(10) Patent No.: US 8,244,142 B2
(45) Date of Patent: Aug. 14, 2012

(54) OPTICAL RECEIVER HAVING FRACTIONAL SAMPLING

(75) Inventors: Andrew Wagner, Los Altos, CA (US); Christian Malouin, San Jose, CA (US); Theodore J. Schmidt, Gilroy, CA (US)

(73) Assignee: Opnext Subsystems, Inc., San Jose, CA (US)

( * ) Notice: Subject to any disclaimer, the term of this patent is extended or adjusted under 35 U.S.C. 154(b) by 399 days.

(21) Appl. No.: 12/607,749

(22) Filed: Oct. 28, 2009

(65) Prior Publication Data

US 2011/0097092 A1    Apr. 28, 2011

(51) Int. Cl.
*H04J 14/06* (2006.01)
*H04B 10/00* (2006.01)
*H04B 10/06* (2006.01)

(52) U.S. Cl. ......... 398/208; 398/65; 398/152; 398/205; 398/206

(58) Field of Classification Search ................. None
See application file for complete search history.

(56) References Cited

U.S. PATENT DOCUMENTS

| | | | | |
|---|---|---|---|---|
| 4,866,647 A | * | 9/1989 | Farrow | 708/313 |
| 5,163,066 A | * | 11/1992 | Cupo et al. | 375/232 |
| 7,061,409 B1 | * | 6/2006 | Jantti et al. | 341/61 |
| 7,340,024 B1 | * | 3/2008 | Nelson et al. | 375/355 |
| 2005/0196176 A1 | * | 9/2005 | Sun et al. | 398/152 |
| 2006/0013597 A1 | | 1/2006 | Crivelli et al. | |
| 2007/0286308 A1 | * | 12/2007 | Williams | 375/302 |
| 2008/0056403 A1 | * | 3/2008 | Wilson | 375/268 |

OTHER PUBLICATIONS

Crochiere et al., "Interpolation and Decimation of Digital Signals—A Tutorial Review", Proceedings of the IEEE, vol. 69, No. 3, Mar. 1981, pp. 300-331.

European Patent Office, International Search Report and Written Opinion in International Patent Application PCT/US2010/054485, mailed Feb. 15, 2011, 13 pages.

Zhou et al., "Digital Signal Processing for Coherent Optical Communication", Wireless and Optical Communications Conference, 2009, IEEE, Piscataway, NJ, USA, May 1, 2009, pp. 1-5.

* cited by examiner

*Primary Examiner* — Kenneth N Vanderpuye
*Assistant Examiner* — Darren E Wolf
(74) *Attorney, Agent, or Firm* — Fish & Richardson P.C.

(57) ABSTRACT

Apparatus and methods for receiving and processing optical signals carrying symbols that represent data, including an optical receiver having fractional sampling analog-to-digital conversion and interpolation timing recovery synchronization for processing an optical signal.

18 Claims, 9 Drawing Sheets

FIG. 9B

OPTICAL RECEIVER HAVING FRACTIONAL SAMPLING

TECHNICAL FIELD

This patent document relates to apparatus, systems and techniques for optical communications.

BACKGROUND

Requirements for higher speeds in communication networks and services continue to increase and such increase demands an increase in the bandwidths of optical communication systems. For example, applications for video, voice, high speed data and Internet continue to increase. Households use bandwidth for YouTube, SDTV, HDTV, personal video recordings, peer-to-peer video, high speed data and VoIP phones. By 2010 in the US, twenty such households are expected to have more traffic than the entire Internet in 1995. The existing 10 G networks operating at a data rate of 10 Gb/s are becoming inadequate in meeting these and other increasing traffic demands.

Therefore, there is a need for operating telecommunications equipment at data rates higher than the current data rate of 10 Gb/s, e.g., 40 G, 100 G and beyond.

SUMMARY

This document describes apparatus and methods for receiving and processing optical signals carrying symbols that represent data.

In one aspect, fractional analog-to-digital conversion sampling and interpolation timing recovery are provided where the sample rate is between one and two times the symbol rate.

In another aspect, fractional analog-to-digital conversion sampling and interpolation timing recovery are provided where the same sampling rate can be used for a wide range of system symbol rates.

In another aspect, an optical receiver for receiving an incoming optical signal carrying symbols is provided to include an optical polarization beam splitter that receives an incoming optical signal carrying symbols and splits the incoming optical signal into a first optical signal carrying the symbols and being in a first optical polarization and a second optical signal carrying the symbols and being in a second optical polarization that is orthogonal to the first optical polarization; a first optical device that receives the first optical signal and an optical local oscillator signal and produces first hybrid output optical signals that are different from one another, each first hybrid output optical signal generated by mixing the first optical signal and the local optical oscillator signal; first optical detectors that receive the first hybrid output optical signals, respectively, and produce first analog electrical baseband signals; a second optical device that receives the second optical signal and the optical local oscillator signal and produces second hybrid output optical signals that are different from one another, each second hybrid output optical signal generated by mixing the second optical signal and the local optical oscillator signal; and second optical detectors that receive the second hybrid output optical signals, respectively, and produce second analog electrical baseband signals. A signal processing circuit is provided for fractional analog-to-digital conversion sampling and interpolation timing recovery. This signal processing circuit receives the first analog electrical baseband signals and the second analog electrical baseband signals and outputs the symbols carried by the incoming optical signal. The signal processing circuit includes means for converting an analog signal carrying the symbols to digital output samples at a fractional sampling clock rate; means for interpolating at an interpolation clock rate different than the fractional sampling clock rate between digital values derived from the digital output samples to provide moving interpolations; and means for synchronizing the moving interpolations with the symbols.

In another aspect, an optical receiver is provided for receiving an incoming optical signal carrying symbols. This optical receiver includes an analog-to-digital converter (ADC) operating at a fractional sampling clock rate to convert an analog signal carrying the symbols to digital ADC output samples; an interpolator to interpolate at an interpolation clock rate different than the fractional sampling clock rate between digital values derived from the digital ADC output samples to provide moving interpolations; and an interpolation feedback loop to synchronize the moving interpolations with the symbols.

In yet another aspect, a method is provided for receiving an incoming optical signal carrying symbols and includes converting an analog signal carrying the symbols to digital ADC output samples at a fractional sampling clock rate; interpolating at an interpolation clock rate different than the fractional sampling clock rate between digital values derived from the digital ADC output samples to provide moving interpolations; and synchronizing the moving interpolations with the symbols using feedback from the moving interpolations.

The above and other aspects of the apparatus and methods described in this document can be implemented to achieve one or more benefits. For example, one benefit is that analog-to-digital conversion can be less than two times the rate of the incoming symbols. Another benefit is that analog impairment recovery can be performed at a digital rate lower than two times the symbol rate. Another benefit is that analog-to-digital conversion can be free running with respect to the symbol rate. Another benefit is that analog-to-digital conversion may be independent of the symbol rate. Another benefit is that data estimation can be performed at a different rate than the analog-to-digital conversion. Another benefit is that timing error detection can be performed at a different rate than either the analog-to-digital conversion or the data estimation.

These and other aspects and their implementations are described in greater detail in the drawings, the description and the claims.

DETAILED DESCRIPTION

This document describes several examples and implementations for apparatus and methods having fractional sampling analog-to-digital (ADC) conversion and interpolation timing recovery synchronization. The ADC conversion may have a free running rate that is independent of the symbol rate of the incoming signal. The ADC conversion rate may be, but is not necessarily, a fraction of the expected symbol rate between one and two times the symbol rate. In some implementations, the fractional ADC conversion rate may be between one and two times the expected symbol rate (baud rate). Digital values are derived from the ADC conversion output samples. Sequential digital values are interpolated to calculate values of moving interpolations. The moving interpolations are calculated temporally between the digital values at interpolation clock sample times that are moving with respect to the ADC clock sample times of the digital values. The moving interpolations are performed at a rate that can be different than the fractional sampling rate of the ADC. Timing recovery is performed on the moving interpolations to synchronize to the incoming signal symbols.

It should be understood that it is not necessary to employ all of the technical details of the features that are described herein. Further, the described technical details may be mixed and matched for a particular implementation based on the specific requirements of the implementation.

Figure 1:
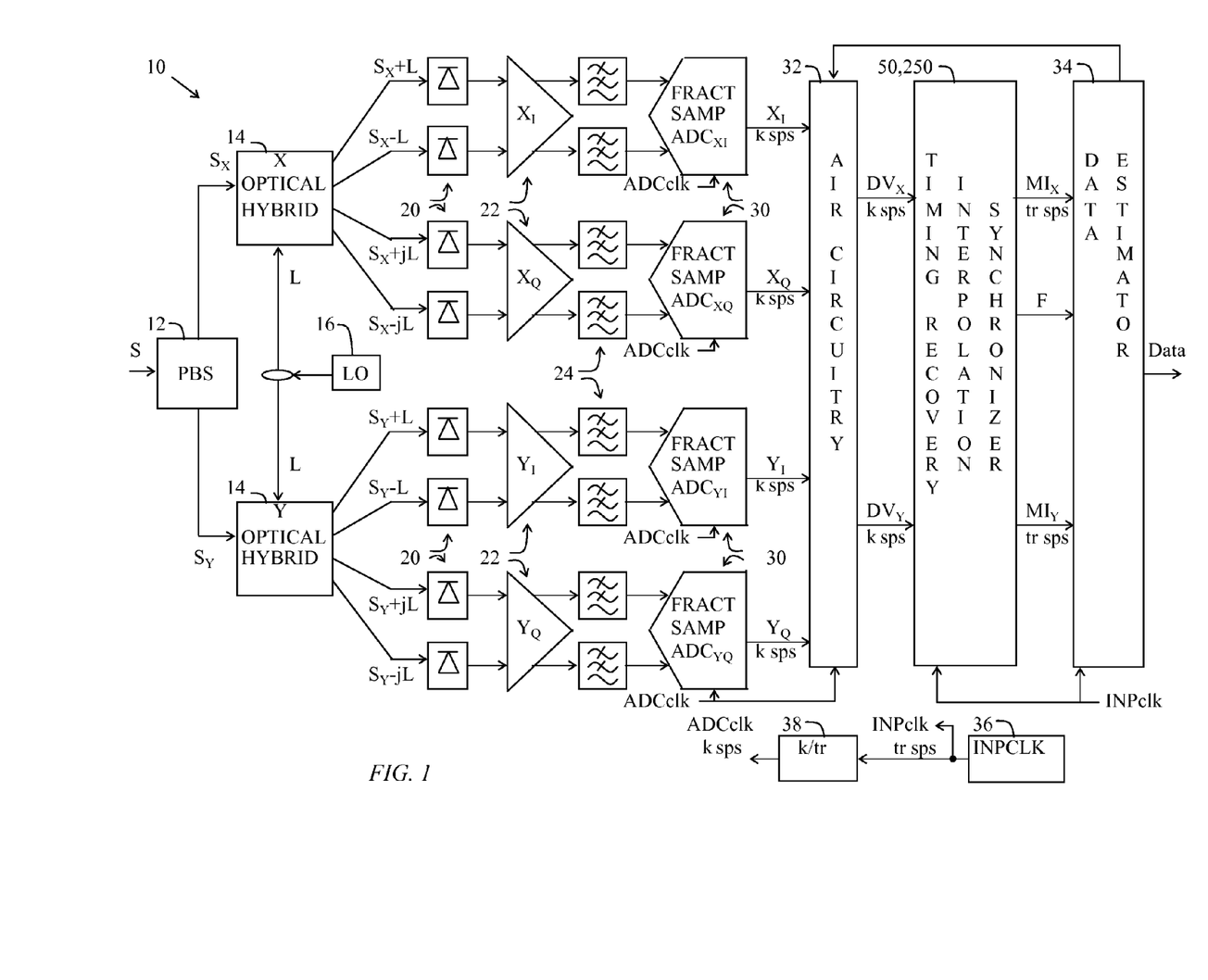
FIG. 1 is a block diagram of an example of an optical receiver having a fractional sampling analog-to-digital converter and a timing recovery interpolation synchronizer.

FIG. 1 is a block diagram of an example of an optical receiver 10. The receiver 10 is a specific implementation of an optical receiver for receiving an incoming optical signal carrying symbols that includes an optical polarization beam splitter at the input. This optical polarization beam splitter receives an incoming optical signal carrying symbols and splits the incoming optical signal into a first optical signal carrying the symbols and being in a first optical polarization and a second optical signal carrying the symbols and being in a second optical polarization that is orthogonal to the first optical polarization. A first optical device is provided to receive the first optical signal and an optical local oscillator signal and produce first hybrid output optical signals that are different from one another. Each first hybrid output optical signal is generated by mixing the first optical signal and the local optical oscillator signal. First optical detectors are provided to receive the first hybrid output optical signals, respectively, and produce first analog electrical baseband signals. Similarly, a second optical device is provided to receive the second optical signal and the optical local oscillator signal and produce second hybrid output optical signals that are different from one another where each second hybrid output optical signal is generated by mixing the second optical signal and the local optical oscillator signal; and second optical detectors are provided to receive the second hybrid output optical signals, respectively, and produce second analog electrical baseband signals. In addition, a signal processing circuit is provided for fractional analog-to-digital conversion sampling and interpolation timing recovery. This signal processing circuit receives the first analog electrical baseband signals and the second analog electrical baseband signals and outputs the symbols carried by the incoming optical signal. The signal processing circuit includes means for converting an analog signal carrying the symbols to digital output samples at a fractional sampling clock rate; means for interpolating at an interpolation clock rate different than the fractional sampling clock rate between digital values derived from the digital output samples to provide moving interpolations; and means for synchronizing the moving interpolations with the symbols.

Referring now to FIG. 1, the optical receiver 10 receives an incoming optical signal S through an optical channel from an optical transmitter. The incoming optical signal S carries modulation where modulation states represent symbols and the symbols represent one or more bits of data. The receiver 10 may be constructed for binary phase shift key (BPSK), quaternary phase shift key (QPSK), quadrature amplitude modulation (QAM), orthogonal frequency division multiplexing (OFDM), one of these formats with optical polarization mixing, a combination of these formats, or other modulations.

The optical receiver 10 includes a polarization beam splitter (PBS) 12 that receives input light and outputs a first optical output in a first optical polarization and a second optical output in a second optical polarization that is orthogonal to the first optical polarization. In some implementations, the polarization beam splitter 12 may be implemented to include a diversity optical mixer and an optical downconverter. The receiver 10 also includes X and Y optical hybrids 14, an optical local oscillator (LO) 16, optical detectors 20, electrical signal amplifiers 22, electrical anti-aliasing filters 24, fractional sampling analog-to-digital converters (ADC's) 30, analog impairment recovery (AIR) circuitry 32, a timing recovery interpolation synchronizer 50 or 250, and a data estimator 34. The interpolation synchronizer 50,250 performs timing recovery and synchronizes to the symbols carried on the incoming optical signal S. The interpolation synchronizer 50,250 changes the signal sample rate from the ADC sample rate to the sample rate needed by the data estimator 34. The interpolation synchronizer 50,250 may change the sample rate from an ADC sample rate that is less than two times the symbol rate to a sample rate that is equal to or greater than two times the symbol rate for timing error detection and/or data estimation.

The polarization beam splitter 12 separates mutually orthogonally polarizations of the incoming optical signal S, e.g., horizontal and vertical polarizations, into an optical signal $S_X$ for horizontal polarization states of the incoming optical signal S and optical signal $S_Y$ for vertical polarization states of the incoming optical signal S. The PBS 12 passes the horizontal and vertical optical signals $S_X$ and $S_Y$ to the X and Y optical hybrids 14, respectively.

The local oscillator 16 generates an optical local oscillator (LO) signal L. The X and Y optical hybrids 14 mix the incoming optical signals $S_X$ and $S_Y$ with the local oscillator signal L to generate hybrid output optical signals. In implementations, the X and Y hybrids 14 can be 90° 8-port devices having four input port and four output port. In the illustrated example, two of the four inputs are used for receiving the optical output from the PBS 12 and the optical local oscillator signal L, respectively and two inputs not used. The 8-port X hybrid 14 outputs four hybrid output optical signals in an X signal path and the 8 port Y hybrid 14 outputs four hybrid output optical signals in a Y signal path. The hybrid output optical signals from the X hybrid 14 are the sums and differences of the optical signal $S_X$ and the real and imaginary local optical signal L and jL. The hybrid output optical signals from the Y hybrid 14 are the sums and differences of the optical signal $S_Y$ and the real and imaginary local optical signal L and jL.

The X optical hybrid 14 mixes the incoming horizontal signal $S_X$ with the local oscillator signal L to generate an optical signal $S_X+L$ for the sum of the incoming horizontal signal $S_X$ and the real local oscillator signal L, an optical signal $S_X-L$ for the difference of the incoming horizontal signal $S_X$ and the real local oscillator signal L, an optical signal $S_X+jL$ for the sum of the incoming horizontal signal $S_X$ and the imaginary local oscillator signal jL, and an optical signal $S_X-jL$ for the difference of the incoming horizontal signal $S_X$ and the imaginary local oscillator signal jL.

Similarly, the Y optical hybrid 14 mixes the incoming vertical optical signal $S_Y$ with the local oscillator signal L to generate an optical signal $S_Y+L$ for the sum of the incoming vertical signal $S_Y$ and the real local oscillator signal L, an optical signal $S_Y-L$ for the difference of the incoming vertical signal $S_Y$ and the real local oscillator signal L, an optical signal $S_Y+jL$ for the sum of the incoming vertical signal $S_Y$ and the imaginary local oscillator signal jL, and an optical signal $S_Y-jL$ for the difference of the incoming vertical signal $S_Y$ and the imaginary local oscillator signal jL.

The detectors 20 detect the hybrid output optical signals to provide respective electrical baseband signals. In an implementation, the detectors can be square law photo diodes. The baseband signals have beating amplitudes proportional to the amplitudes and phases of the modulations of the optical signals $S_X$ and $S_Y$. The detectors 20 pass the baseband signals to the amplifiers 22. The baseband signals are proportional to $|S_X+L|^2$ and $|S_X-L|^2$ in an $X_I$ path, proportional to $|S_X+jL|^2$ and $|S_X-jL|^2$ in an $X_Q$ path, proportional to $|S_Y+L|^2$ and $|S_Y-L|^2$ in a $Y_I$ path and proportional to $|S_Y+jL|^2$ and $|S_Y-jL|^2$ in a $Y_Q$ path. In another implementation the X and Y hybrids 14 are 6-port (three input port and three output port) devices for detection of single-sided hybrid output optical signals. While balanced detection is used to cancel out the contribution of the local oscillator signal L, single-sided detection can also be used.

An $X_I$ amplifier 22 amplifies the electrical $|S_X+L|^2$ and $|S_X-L|^2$ signals. An $X_Q$ amplifier 22 amplifies the electrical $|S_X+jL|^2$ and $|S_X-jL|^2$ signals. A $Y_I$ amplifier 22 amplifies the electrical $|S_Y+L|^2$ and $|S_Y-L|^2$ signals. A $Y_Q$ amplifier 22 amplifies the electrical $|S_Y+jL|^2$ and $|S_Y-jL|^2$ signals. The amplifiers 22 pass the amplified electrical signals as analog signals to the fractional sampling analog-to-digital converters (ADC's) 30.

Anti-aliasing filters 24 before or at the input of the fractional sampling ADC's 30 are positioned in the signal paths to reduce aliasing effects.

An ADC 30 converts the analog signal $(|S_X+L|^2-|S_X-L|^2)$ to digital ADC output samples $X_I$. An $ADC_{XQ}$ 30 converts the analog signal $(|S_X+jL|^2-|S_X-jL|^2)$ to digital ADC output samples $X_Q$. An $ADC_{YI}$ 30 converts the analog signal $(|S_Y+L|^2-|S_Y-L|^2)$ to digital ADC output samples $Y_I$. An $ADC_{YQ}$ 30 converts the analog signal $(|S_Y-jL|^2-|S_Y-jL|^2)$ to digital ADC output samples $Y_Q$. In another implementation, the amplifiers 22 generate single sided signals to the ADC's 30. It should be noted at this point that the modulation for the symbols that was carried by the incoming optical signal S continues to be carried in a representative way on the amplitudes of the values of the ADC output samples. The ADC's 30 pass the ADC output samples to the analog impairment recovery (AIR) circuitry 32.

The AIR circuitry 32 performs digital corrections on the ADC output samples $X_I$ and $X_Q$ to compensate for analog impairments to the optical signal S caused by imperfections in the optical transmitter, optical channel, optical modules in the front end of the receiver 10 and electrical components up to the AIR circuitry 32. The corrections are sometimes called IQ corrections. The performance of the AIR circuitry 32 for IQ corrections may be aided by feedback from the data estimator 34. The corrected ADC output samples are generated as digital values $DV_X$ in the X signal path and digital values $DV_Y$ in the Y signal path.

The digital values $DV_X$ and $DV_Y$ may be implemented as complex numbers where one portion of a word for the digital value carries an I (in-phase) value and another portion of the word carries a Q (quadrature-phase) value, i.e. a DV is I+jQ. The sequences of the digital values $DV_X$ and $DV_Y$ continue to carry modulation on their amplitude values that represents the signal symbols carried in the incoming signal S but corrected for estimates of impairments to more closely resemble the symbols that were intended to be transmitted. The AIR circuitry 32 passes the digital values $DV_X$ and $DV_Y$ to the interpolation synchronizer 50,250.

The interpolation synchronizer 50,250 interpolates between successive digital values $DV_X$ to determine values for moving interpolations $MI_X$; and interpolates between successive digital values $DV_Y$ to determine values for moving interpolations $MI_Y$. The values for the moving interpolations $MI_X$ and $MI_Y$ may be carried as complex numbers of I and Q.

The timing of the moving interpolations $MI_X$ and $MI_Y$ is synchronized to the timing of the symbols by the interpolation synchronizer 50,250. The interpolation synchronizer 50,250 passes the synchronized moving interpolations $MI_X$ and $MI_Y$ to the data estimator 34.

The data estimator 34 includes equalizers, demodulators, decoders, coders, and error detection and correction circuitry to process the values of the moving interpolations $MI_X$ and $MI_Y$ in order to estimate the data that was actually transmitted or intended to be transmitted by the transmitter.

The receiver 10 includes an interpolation clock (INPCLK) 36 and a fractional sampling divider 38. The INPCLK 36 provides an interpolation clock signal INPclk at a free running interpolation clock rate. The fractional sampling divider 38 frequency divides the interpolation clock signal INPclk to provide an ADC clock signal (ADCclk) at a fractional sampling clock rate. The interpolation clock signal INPclk and the fractional sampling clock signal ADCclk are not required to be synchronized to the symbols. The interpolation clock rate is nominally tr times the expected symbol rate (tr sps) where tr is a selected multiple and the abbreviation sps stands for samples per symbol. In some implementations, the interpolation clock rate is slightly greater than tr sps. In some implementations, the fractional sampling clock rate is a fraction between one-half and one times tr sps. In some implementations, the selected multiple tr is two. In this implementation the interpolation clock rate is nominally (or slightly greater than) two samples per symbol and the fractional sampling clock rate is nominally between one and two samples per symbol. The true symbol rate, at the selected multiple tr, is recovered by the interpolation synchronizer 50,250.

The fractional sampling divider 38 frequency divides the INPclk by tr/k. This effectively multiplies the frequency of the INPclk signal by k/tr to provide the fractional sampling clock signal ADCclk, where k is a sampling rate fraction. The ADCclk signal may operate the ADC's 30 to provide the ADC output samples $X_I, X_Q, Y_I$ and $Y_Q$ at the sampling rate fraction k times an expected symbol rate. In one implementation, the sampling rate fraction k is in the range between one and two. In some implementations, the sampling rate fraction k is 5/4. The ADC's 30 use the fractional sampling ADCclk signal to sample the analog signals from the amplifiers 22 and anti-aliasing filters 24 to provide the streams of ADC output samples $X_I, X_Q, Y_I, Y_Q$.

Several hardware analog-to-digital converters may operate in parallel for each of the $ADC_{XI}$ 30, $ADC_{XQ}$ 30, $ADC_{YI}$ 30, and $ADC_{YQ}$ 30. For example, $ADC_{XI}$ 30 would have several analog-to-digital converters operating in parallel and so on for $ADC_{XQ}$ 30, $ADC_{YI}$ 30, and $ADC_{YQ}$ 30. In this implementation, each of the parallel analog-to-digital converter samples the analog signal at a sample rate that is divided by the number of parallel analog-to-digital converters. For example, in one implementation, 128 analog-to-digital converters are operated in parallel for each of the $ADC_{XI}$ 30, $ADC_{XQ}$ 30, $ADC_{YI}$ 30, and $ADC_{YQ}$ 30. In this case, each analog-to-digital converter samples the analog signal at a nominal rate of k/128 sps to effectively provide the ADC output samples $X_I$, $X_Q$, $Y_I$, and $Y_Q$ at a nominal rate of k sps.

The AIR circuitry 32 operates with the ADCclk signal to process the ADC output samples $X_I$, $X_Q$, $Y_I$, and $Y_Q$ to provide the digital values $DV_X$ and $DV_Y$. In one implementation, the AIR circuitry 32 receives the ADC output samples as separate I and Q streams for the optical $S_X$ polarity and separate I and Q streams for the optical $S_Y$ polarity (or several parallel streams for $X_I$, several parallel streams for $X_Q$, several parallel streams for $Y_I$, several parallel streams for $Y_Q$) and generates digital values $DV_X$ and $DV_Y$ as separate streams having complex IQ (or several parallel streams for $DV_X$ complex IQ and several parallel streams for $DV_Y$ complex IQ). In some implementations, the complex IQ is carried by the I information being allocated certain bit positions in an IQ word and the Q information being allocated other bit positions in the IQ word. The effective output rates of the digital values $DV_X$ and $DV_Y$ from the AIR circuitry 32 is nominally k sps.

The sequences of the ADC output samples $X_I$, $X_Q$, $Y_I$ and $Y_Q$ and the sequences of the digital values $DV_X$ and $DV_Y$ are free running, not synchronized to the symbol rate. The interpolation synchronizer 50,250 passes an inhibitor flag F to the data estimator 34 in order to bring the average rate of the INPclk signal to tr sps and to control the digital clocking operation of the data estimator 34 to tr sps as viewed in the data domain.

Figure 2:
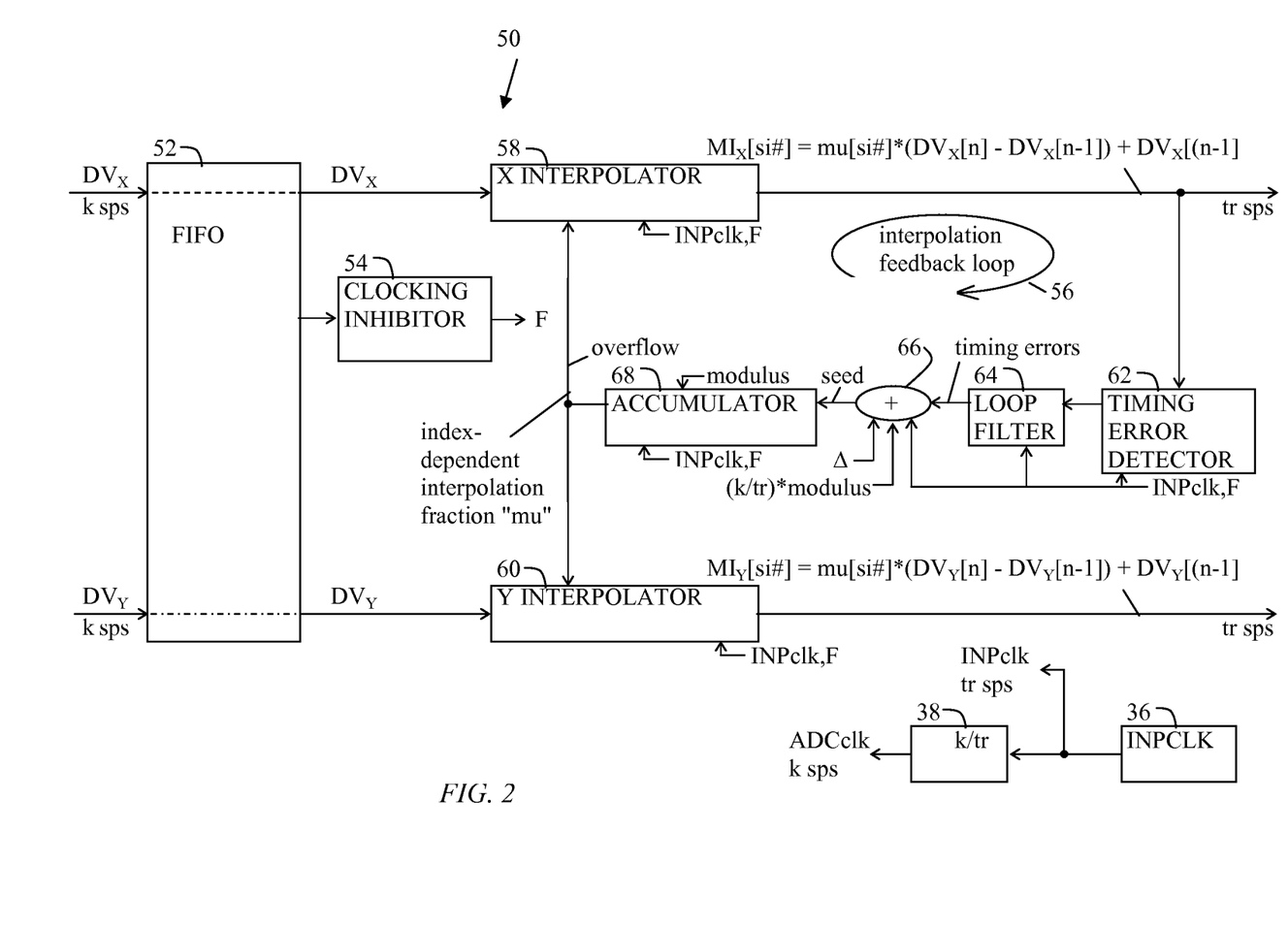
FIG. 2 is block diagram of an example of the interpolation synchronizer of FIG. 1.

FIG. 2 is block diagram of an example of the interpolation synchronizer 50 for the optical receiver 10. The interpolation synchronizer 50 includes a first in first out memory (FIFO) 52, a clocking inhibitor 54, and an interpolation feedback loop 56 including an X interpolator 58. The interpolation synchronizer 50 also includes a Y interpolator 60.

The interpolation feedback loop 56 includes the X interpolator 58, a timing error detector 62, a loop filter 64, a seed generator 66, and an accumulator 68. In some implementations, the sampling rate fraction k is between one and two; the INPclk has a clock rate slightly greater than two samples per second; and the interpolation synchronizer 50 provides moving interpolation values $MI_X$ and $MI_Y$ at two samples per symbol. The X and Y interpolators 58 and 60 are configured as horizontal and vertical polarization interpolators, corresponding to optical signals $S_X$ and $S_Y$, respectively. Only the X interpolator 58 is required when the optical signal S has only one polarization.

The AIR circuitry 32 writes the digital values $DV_X$ and $DV_Y$ into the FIFO 52 with the ADCclk signal. The X and Y interpolators 58 and 60 read the digital values $DV_X$ and $DV_Y$, respectively, from the FIFO 52 on a first in first out basis at overflows of the accumulator 68. Occasionally, reading the FIFO 52 at a faster rate than writing into the FIFO 52 causes the number of stored values in the FIFO 52 to fall below a selected threshold. The terms "empty", "not valid" and "invalid" are used herein to designate a condition where the number of the digital values in the FIFO 52 is less than this threshold, and the terms "filled", "full" and "valid" are used herein to describe a condition where the number of digital values in the FIFO 52 is greater than this threshold. When the FIFO 52 is empty, the clocking inhibitor 54 sets the inhibitor flag F (also called the FIFO flag F) to indicate that the FIFO 52 is not valid. When the FIFO 52 is full, the clocking inhibitor 54 sets the flag F to indicate that the FIFO 52 is valid.

The elements of the interpolation feedback loop 56 and the Y interpolator 60 are clocked by the interpolation clock signal INPclk. The flag F controls the digital clocking operation of the signal INPclk for the interpolation synchronizer circuitry 50. When the FIFO 52 is not valid the clocking inhibitor 54 stops or freezes the interpolation clock signal INPclk, or stops or freezes the circuitry in the interpolation synchronizer 50 so that the circuitry does not respond to the interpolation clock signal INPclk. The FIFO flag F is set to valid when a new set of digital values $DV_X$ and $DV_Y$ are written into the FIFO 52 and the number of stored values fills above the threshold. When the FIFO 52 is valid, the clocking by the interpolation clock signal INPclk resumes.

An effect of the flag F is to bring the average rate of the interpolation clock signal INPclk to tr sps and to control the digital clocking of the interpolation synchronization circuitry 50 to tr sps as viewed in the data domain. In one implementation, the inhibitor flag F acts to swallow an occasional extra cycle in the interpolation clock signal INPclk. The inhibitor flag F acts to synchronize the free running (as visualized in the time domain with an oscilloscope) interpolation clock signal INPclk to tr sps (as visualized in the data domain with a data analyzer).

The timing error detector 62 detects timing errors between the timing of the moving interpolations $MI_X$ and the timing of the symbols carried by the values of moving interpolations $MI_X$ in order to provide values for timing errors. The timing error detector 62 can use an early-late technique, a Gardener algorithm, and/or a Mueller Muller algorithm. The loop filter 64 filters the values and provides filtered timing error values to the seed generator 66. The seed generator 66 calculates a seed value from the sum of the timing error value and an offset value. The offset value is based on a fractional clock ratio between the ADC clock rate and the interpolation clock rate. In some implementations, the fractional clock ratio is k/tr times (scaled by) a modulus (maximum output value) of the accumulator 68. The offset value may also include an overflow rate compensation Δ. The overflow rate compensation Δ can be used to mitigate a difference between the interpolation clock rate and the desired tr sps in order to bias the overflow rate of the accumulator 68 to reduce the frequency of occurrence for the FIFO 52 to become empty.

The seed generator 66 provides the seed values to the accumulator 68. The accumulator 68 has an output value having a maximum output value set by its modulus. The accumulator 68 increments its current output value by each new seed value to provide a new output value. An overflow occurs when the addition of the new seed causes the new output to exceed the modulus. An overflow by the accumulator 68 causes the X and Y interpolators 58 and 60 to read the next digital values $DV_X$ and $DV_Y$, respectively, from the FIFO 52.

The output value of the accumulator 68 is an index-dependent interpolation fraction referred to as mu. The fraction mu is used by the X interpolator 58 to interpolate between sequential digital values $DV_X$ from the FIFO 52. The same interpolation fraction mu is used at the same time by the Y interpolator to interpolate between sequential digital values $DV_Y$ from the FIFO 52.

The X and Y interpolators 58 and 60 interpolate between a most recent [n] and a second most recent [n−1] previous digital value in order to provide the values of the moving interpolations $MI_X$ and $MI_Y$, respectively, according to Equation 1 below:

$$MI[si\#] = mu[si\#] * (DV[n] - DV[n-1]) + DV[n-1] \quad \quad 1$$

In the equation 1, si# is an index for the interpolation fraction mu and n is an index for the digital values $DV_X$ and $DV_Y$. The interpolation fraction mu[si#] is provided by the accumulator 68 according to Equation 2 below:

$$mu[si\#] = si\# * (k/tr) \text{modulo} 1 \quad \quad 2$$

Figure 3:
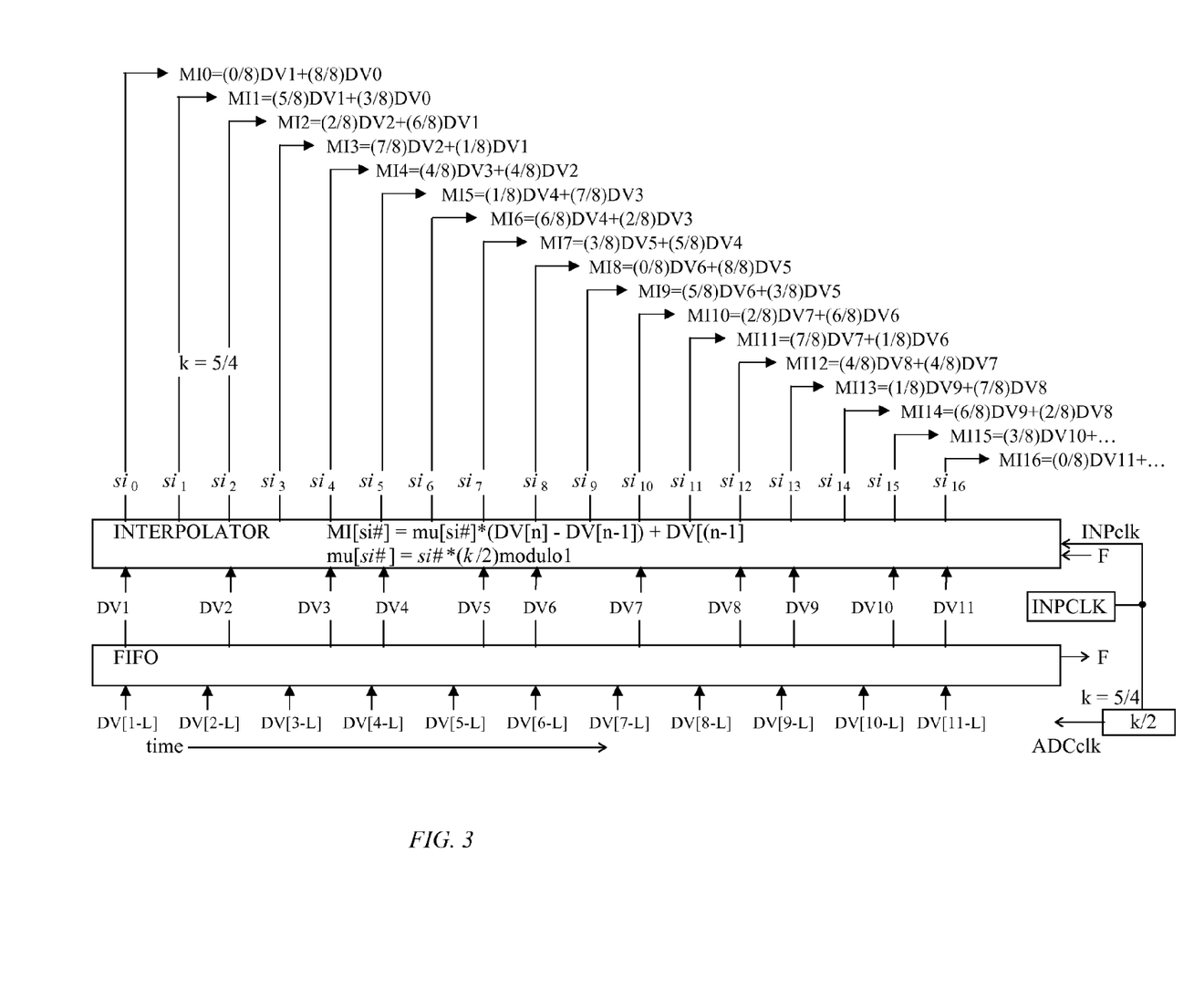
FIG. 3 is a diagram of a numerical example for the interpolation synchronizer of FIG. 2.

FIG. 3 shows a numerical example for the calculations performed by the X and Y interpolators 58 and 60 to interpolate the digital values $DV_X$ and $DV_Y$ to calculate the moving interpolations $MI_X$ and $MI_Y$, respectively, according to the equations 1 and 2 where tr equals two.

The numerical example applies to both the X and Y interpolators 58 and 60. In the example, the calculations are shown for an operational sampling rate fraction k=5⁄4 and a selected multiple tr of 2 samples per symbol (sps) for timing recovery. The sequential digital values DV are written into the FIFO 52 at a free running rate of about 5⁄4 samples per symbol (sps). An overflow from the accumulator 68 causes the interpolators 58 and 60 to read digital values DV[n] from the FIFO 52 in the same order that they were written (first in first out).

The interpolators 58 and 60 store the digital values DV so that they can perform interpolations between a new reading from the FIFO 52 and a last previous reading when the accumulator 68 overflows or between last and second to last previous reading when the accumulator 68 does not overflow. Both interpolators 58 and 60 interpolate with the same interpolation fraction mu. The successive interpolations with the successive interpolation fractions mu are identified with successive index numbers $si_\#$ for cycles of the interpolation clock signal INPclk.

The example shows digital values DV[1−L] to DV[11−L] written to the FIFO 52 at cycles of the ADCclk where L is a length of the FIFO 52. The digital values DV1 to DV11 are read L later by the interpolators 58 and 60 when the accumulator 68 overflows.

The following description of the numerical example applies equally to the operation of each of the interpolators 58 and 60. At INPclk index $si_0$, the accumulator 68 overflows, a new digital value DV1 is read and stored, and the interpolator interpolates the digital value DV1 with a digital value DV0 (stored in the interpolator from a prior reading) to calculate a moving interpolation value MI0=(0/8)DV1+(8/8)DV0. At INPclk index $si_1$, the interpolator interpolates the most recent digital value DV1 with the second most recent digital value DV0 to calculate a moving interpolation value MI1=(5/8)DV1+(3/8)DV0. At INPclk index $si_2$, a new digital value DV2 is read with an accumulator overflow and the interpolator interpolates the new digital value DV2 with the most recent prior digital value DV1 to calculate a moving interpolation value MI2=(2/8)DV1+(6/8)DV0. At INPclk index $si_3$, the interpolator interpolates the most recent digital value DV2 with the second most recent digital value DV1 to calculate a moving interpolation value MI3=(7/8)DV2+(1/8)DV1.

At INPclk index $si_4$, a new digital value DV3 is read with an accumulator overflow and the interpolator interpolates the new digital value DV3 with the most recent prior digital value DV2 to calculate a moving interpolation value MI4=(4/8)DV3+(4/8)DV2. At INPclk index $si_5$, a new digital value DV4 is read with an accumulator overflow and the interpolator interpolates the new digital value DV4 with the most recent prior digital value DV3 to calculate a moving interpolation value MI5=(1/8)DV4+(7/8)DV2. At INPclk index $si_6$, the interpolator interpolates the most recent digital value DV4 with the second most recent digital value DV4 to calculate a moving interpolation value MI6=(6/8)DV4+(2/8)DV3.

At INPclk index $si_7$, a new digital value DV5 is read with an accumulator overflow and the interpolator interpolates the new digital value DV5 with the most recent prior digital value DV4 to calculate a moving interpolation value MI7=(3/8)DV5+(5/8)DV4. At INPclk index $si_g$, a new digital value DV6 is read with an accumulator overflow and the interpolator interpolates the new digital value DV6 with the most recent prior digital value DV5 to calculate a moving interpolation value MI8=(0/8)DV6+(8/8)DV5. The determinations of moving interpolations MI8 to MI15 repeat the pattern described above for the determinations of the moving interpolations MI0 to MI7.

Figure 4:
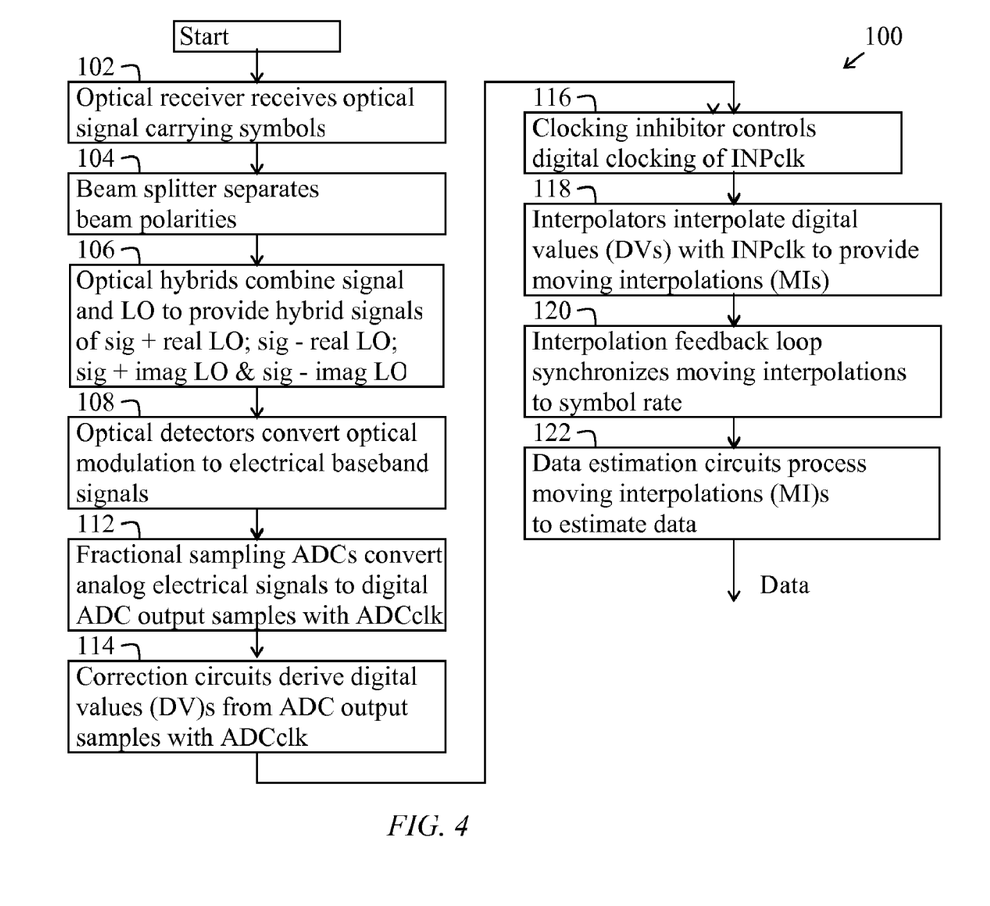
FIG. 4 is a flow chart of an example of a method for processing an optical signal with fractional sampling analog-to-digital conversion and timing recovery interpolation synchronization.

FIG. 4 is a flow chart of steps of an example of a method for receiving a modulated optical signal and processing the signal with fractional sampling and interpolation timing recovery. Any one or more of the steps in this method may be stored on a tangible medium 100 in a computer-readable form as instructions that may be read by a computer for instructing an optical receiver for carrying out the steps. The tangible medium 100 may be one or more physical articles. Examples of such physical articles are magnetic discs known as hard discs and optical discs known as DVDs or DVRs.

An optical receiver, in a step 102, receives an incoming modulated optical signal carrying symbols from a transmitter through an optical channel. The symbols represent encoded data. In a step 104 a beam splitter separates horizontal and vertical polarization states of the optical signal. In a step 106, optical hybrids in horizontal and vertical signal paths combine the incoming horizontal and vertical signals with an optical local oscillator signal to provide hybrid output optical signals. The hybrid output optical signals are beating signals for incoming signal+real local oscillator signal, incoming signal−real local oscillator signal, incoming signal+imaginary local oscillator signal, and incoming signal−imaginary local oscillator signal for each of the horizontal and vertical polarization states.

Optical detectors, in a step 108, follow the modulation on the hybrid output optical signals to provide baseband electrical signals proportional to the modulation. In a step 112, fractional analog-to-digital converters sample the electrical signals with the ADCclk signal to provide digital values as ADC output samples. In a step 114 the ADC output samples are processed in AIR circuitry to make IQ corrections for analog impairments that occur in the optical transmitter, optical channel and/or front end of the optical receiver. The corrected ADC output samples are generated as digital values DV's to interpolation timing recovery (synchronization) circuitry. In a step 116 the digital clocking of the interpolation timing recovery circuits is controlled to stop or freeze the circuits or swallow clock pulses to synchronize to the symbol rate. For the step 116, the interpolation clock signal INPclk may gated with the FIFO valid flag F.

The interpolators, in a step 118, interpolate the digital values DV's to provide values for moving interpolations MI's. In a step 120 an interpolation feedback loop synchronizes the moving interpolation values MI's to a selected multiple tr of the incoming signal symbols. In a step 122 the data is estimated from the symbols that are carried by the values of the moving interpolations.

Figure 5:
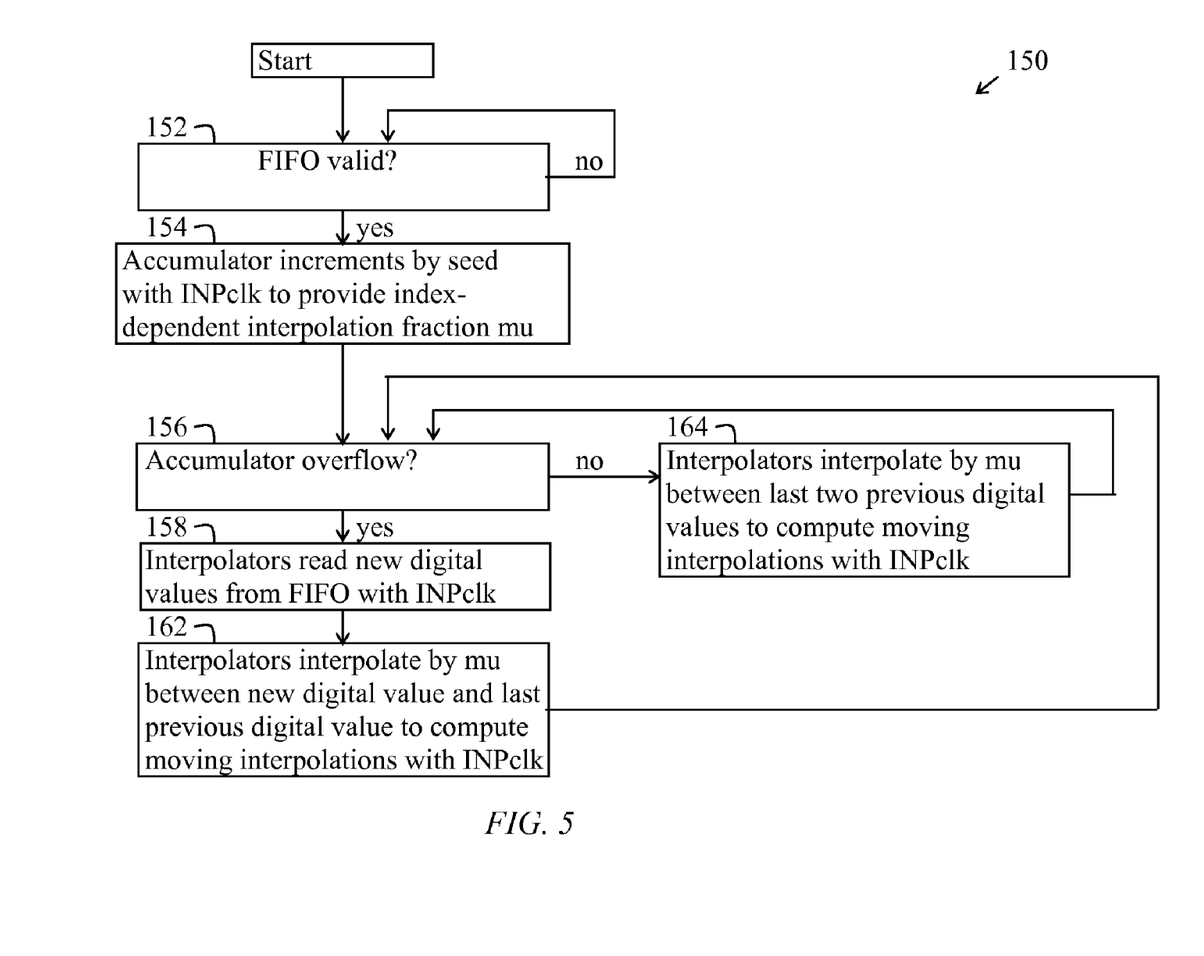
FIG. 5 is a first flow chart for an example of the interpolation synchronization in the method of FIG. 4.

FIG. 5 is a flow chart of an example of a method for timing recovery with interpolation. Any one or more of the steps in this method may be stored on a tangible medium 150 in a computer-readable form as instructions that may be read by a computer for instructing an optical receiver for carrying out the steps. The tangible medium 150 may be one or more physical articles. Examples of such physical articles are magnetic and optical discs.

The FIFO flag F in a step 152 is set to valid when the FIFO 52 is full and not valid when the FIFO 52 is empty. When the FIFO flag F indicates the FIFO 52 is empty the clock operation of the interpolation clock signal INPclk is inhibited. In a step 154 when the FIFO flag F indicates the FIFO 52 is full the accumulator 68 increments with the interpolation clock signal INPclk by a seed to provide the index-dependent interpolation fraction mu.

In a step 156 when the addition (accumulation) of the seed to the output of the accumulator 68 causes the accumulator output to exceed its modulus, the accumulator 68 overflows. In a step 158 when the accumulator 68 overflows, the interpolators 58 and 60 read the new digital values $DV_X$ and $DV_Y$ from the FIFO 52. In a step 162 using the interpolation clock signal INPclk, the X interpolator 58 interpolates by mu between the new digital value $DV_X[n]$ and the stored most recent previous digital value $DV_X[n-1]$ to compute the new moving interpolation value $MI_X$. Similarly, using the interpolation clock signal INPclk, the Y interpolator 60 interpolates by mu between the newly read digital value $DV_Y[n]$ and the stored most recent previous digital value $DV_Y[n-1]$ to compute the new moving interpolation value $MI_Y$.

When the accumulator 68 does not overflow in the step 156, then in a step 164 using the interpolation clock signal INPclk, the X interpolator 58 interpolates by mu between the stored last previous digital value $DV_X[n]$ and the stored second to last previous digital value $DV_X[n-1]$ to compute the new moving interpolation value $MI_X$. Similarly, using the interpolation clock signal INPclk, the Y interpolator 60 interpolates by mu between the last previous digital value $DV_Y[n]$ and the second to last previous digital value $DV_Y[n-1]$ to compute the new moving interpolation value $MI_Y$.

Figure 6:
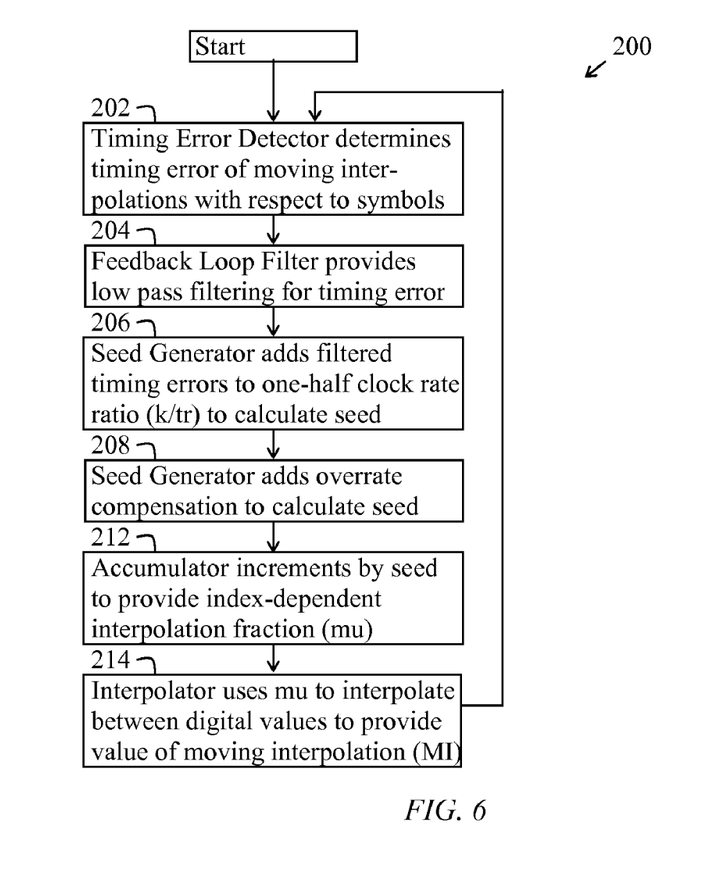
FIG. 6 is a second flow chart for an example of the interpolation synchronization in the method of FIG. 4.

FIG. 6 is a flow chart of steps for an example of a method for using feedback in an interpolation loop for interpolation timing recovery. Any one or more of the steps in this method may be stored on a tangible medium 200 in a computer-readable form as instructions that may be read by a computer for instructing an optical receiver for carrying out the steps. The tangible medium 200 may be one or more physical articles. Examples of such physical articles are magnetic and optical discs.

The steps in the feedback are operated with the interpolation clock signal INPclk with the gating condition that the FIFO flag F shows that the FIFO 52 is valid. When the FIFO 52 is not valid the steps are stopped until the FIFO 52 is again valid by writing new digital values derived from the ADC output samples with the ADCclk signal. In a step 202 the timing error detector 62 determines timing errors between the sequence of moving interpolations $MI_X$ from the X interpolator 58 and the symbols that are carried by the sequence of moving interpolations $MI_X$. In a step 204 the timing errors are filtered by a low pass filter 64. In a step 206 the seed generator 66 adds the filtered timing error to the clock rate ratio k/tr scaled by the accumulator modulus. Where the data estimator 34 operates at 2 sps, the clock rate ratio is k/2. In a step 206 optionally the seed generator 66 adds an overrate compensation $\Delta$ to provide an open loop correction to the rate at which the X and Y interpolators 58 and 60 read from the FIFO 52. This correction may be desired to reduce the frequency with which the FIFO 52 becomes not valid.

The accumulator 68 in a step 212 increments by the seed to provide the index-dependent interpolation fraction mu at the accumulator output. Then, in a step 214 the X and Y interpolators 58 and 60 use the fraction mu to interpolate between consecutive digital values $DV_X$ and $DV_Y$, respectively, to provide moving interpolations $MI_X$ and $MI_Y$, respectively.

Figure 7:
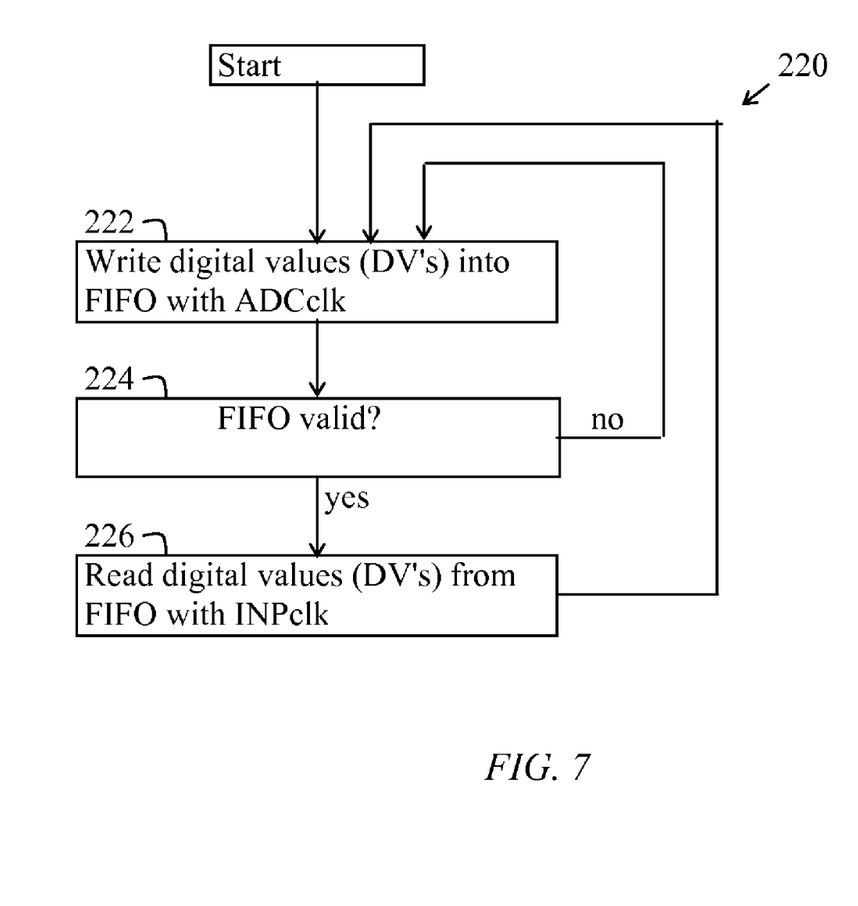
FIG. 7 is a flow chart for an example of digital clocking control in the method of FIG. 4.

FIG. 7 is a flow chart of steps of an example of a method for synchronizing the digital clocking of the optical receiver 10 to the incoming signal symbols. Any one or more of the steps in this method may be stored on a tangible medium 220 in a computer-readable form as instructions that may be read by a computer for instructing an optical receiver for carrying out the steps. The tangible medium 220 may be one or more physical articles. Examples of such physical articles are magnetic and optical discs.

Complex digital values $DV_X$ and $DV_Y$ in a step 222 are written into the FIFO 52 with cycles of the free running ADCclk signal. In a step 224 when the FIFO 52 is not empty, the clocking inhibitor 54 generates the FIFO flag F to indicate that the FIFO 52 is valid. In a step 226 when the FIFO 52 is valid, the digital values $DV_X$ and $DV_Y$ are read by the X and Y interpolators 58 and 60, respectively, at accumulator overflows with cycles of the interpolation clock signal INPclk. When the FIFO 52 is not valid, the X and Y interpolators 58 and 60 are inhibited or prevented from using the interpolation clock signal INPclk until new digital values $DV_X$ and $DV_Y$ are written into the FIFO 52 and the FIFO 52 becomes valid. The operation of the clocking inhibitor 54 can be viewed as swallowing cycles of the interpolation clock signal INPclk with the effect that the interpolation clock signal INPclk becomes synchronized in the data domain with the symbols. It should be noted that in the time domain there would be time gaps in the operation of the digital circuits having clocking that is controlled by the FIFO flag F.

Figure 8:
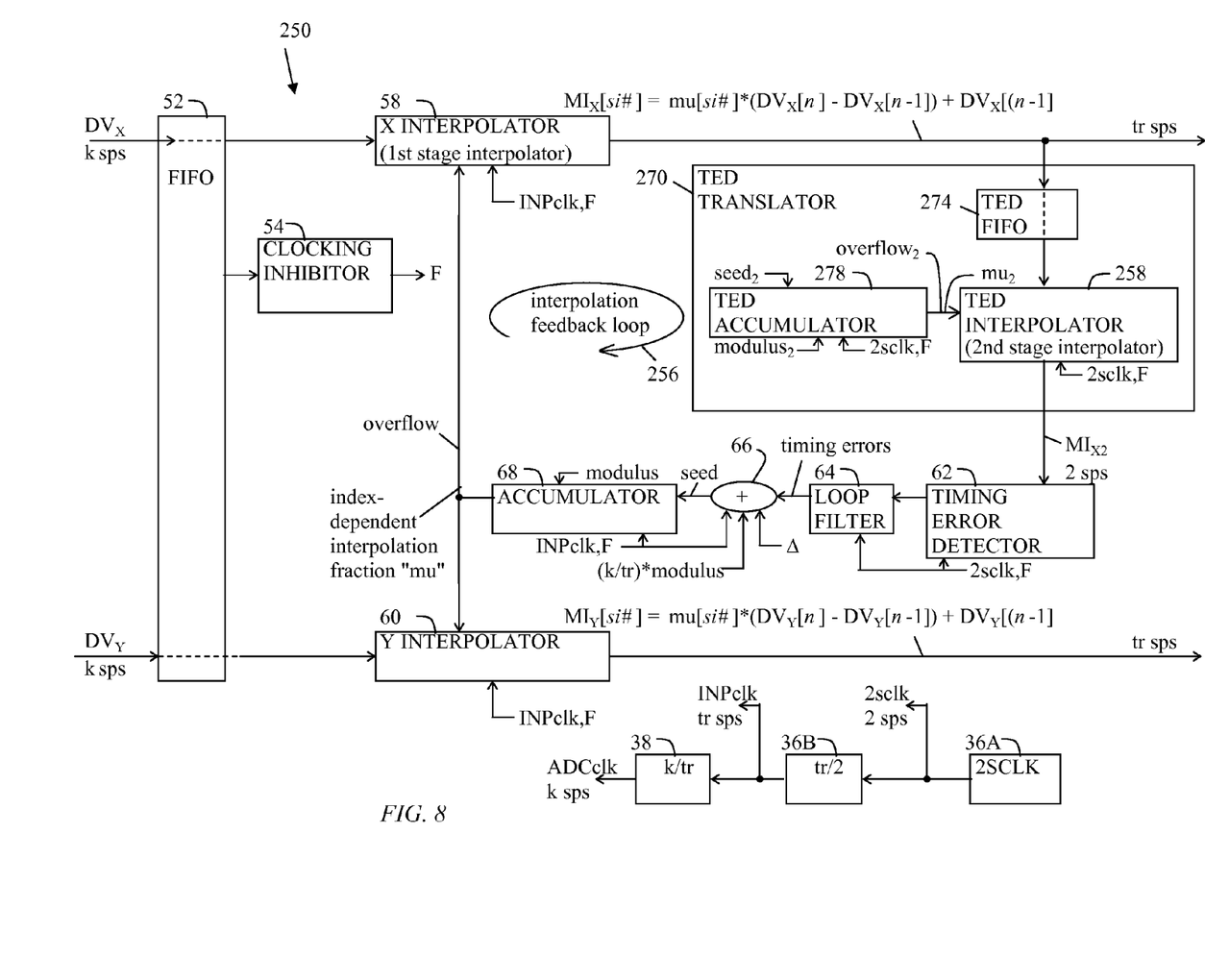
FIG. 8 is a block diagram of an example of the interpolation synchronizer of FIG. 1 having two stage interpolation.

FIG. 8 is a block diagram of an example of the interpolation synchronizer 250 for the optical receiver 10. The interpolation synchronizer 250 includes the FIFO 52, the clocking inhibitor 54, the X interpolator 58 and the Y interpolator 60 as described above, and an interpolation feedback loop 256 where the interpolation feedback loop 256 has two stages of interpolation. The first stage of interpolation is the interpolator 58 and the second stage of interpolation is a second interpolator 258 referred to as a timing error detector (TED) interpolator 258.

The first stage of interpolation 58 in the interpolation feedback loop 256 provides the moving interpolations $MI_X$, as described above, to the data estimator 34 at the selected symbol rate multiple tr sps. The second stage interpolator 258 (TED interpolator 258) interpolates the moving interpolations $MI_X$ to provide second interpolations $MI_{X2}$ to the timing error detector 62.

The interpolation feedback loop 256 includes the X interpolator 58, the timing detector 62, the loop filter 64, the seed generator 66 and the accumulator 68 as described above, and a timing error detector (TED) translator 270. The TED translator 270 includes a TED FIFO 274, a TED accumulator 278, and the TED interpolator 258. The interpolation clock 36 in the optical receiver 10 is replaced by the combination of a 2SCLK clock 36A and a TED divider 36B.

The 2SCLK clock 36A generates a clock signal 2sclk at a free running rate of nominally 2 sps or slightly greater than 2 sps. The TED divider 36B frequency divides the 2sclk by 2/tr. The effect of the frequency division is to multiply the frequency of the 2sclk signal by tr/2 to provide the interpolation clock signal INPclk at tr sps. The 2sclk signal (controlled as described above by the flag F) is used by the translator 270, the timing error detector 62 and the loop filter 64. The INPclk signal (controlled as described above by the flag F) is used by the X and Y interpolators 58 and 60, the seed generator 66 and the accumulator 68, and is passed to the data estimator 34.

The moving interpolations $MI_X$ are synchronized to the incoming signal samples by the interpolation feedback loop 256 at a rate of tr samples per second (sps) where tr is the selected multiple of the symbol rate. The moving interpolations $MI_Y$ are provided at the same tr sps rate by the Y interpolator 60. The two stage interpolation is especially advantageous to use timing error detector techniques and algorithms that are available for synchronization at two times the symbol rate while simultaneously providing moving interpolations MI's for data estimation at rates other than two times the symbol rate (tr not equal to 2).

The FIFO 274 receives the moving interpolations $MI_X$ at the rate of tr sps. The interpolator 258 and the accumulator 278 are clocked with the 2sclk signal controlled by the flag F from the FIFO 52. The interpolator 258 reads the moving interpolations $MI_X$ at the rate of a second stage overflow (overflow$_2$) from the accumulator 278 and interpolates the between the moving interpolations $MI_X$ to provide the second interpolations $MI_{X2}$. The TED accumulator 278 operates with a second stage modulus (modulus$_2$) and a second stage seed (seed$_2$) to generate second stage index-dependent interpolation frequency mu's (mu$_2$'s) and generate the overflow$_2$'s when the modulus$_2$ is exceeded by the accumulation in a similar manner to the above described accumulator 68. In some implementations, the seed$_2$ is the clock rate fraction tr/2 times the modulus$_2$. The flag F stops the operation of the FIFO 274, interpolator 258 and accumulator 278 when the FIFO 52 is invalid.

The interpolation synchronizer 250 with the two stage interpolation has the benefit of enabling the timing error detector 62 to operate with clocking at 2 sps while the data estimator 34 operates with a possibly different clocking rate of tr sps. This also enables the ADC's 30 to operate at a free running rate that is independent of the incoming symbol rate and independent of the selected tr rate so that the optical receiver 10 can be used in optical systems with different symbol rates. The TED interpolator 258 interpolates between the moving interpolations $MI_X$ synchronized to tr sps (in the data domain) to provide to the moving interpolations $MI_{X2}$ synchronized to 2 sps (in the data domain).

Figure 9A:
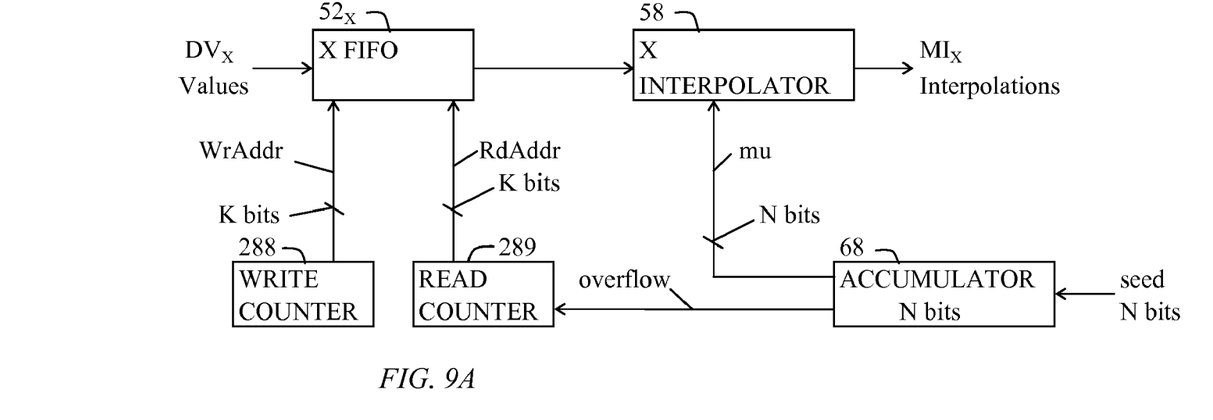
FIGS. 9A and 9B are alternative block diagrams of an example of the FIFO operation for the interpolation synchronizers of FIGS. 2 and 8.
Figure 9B:
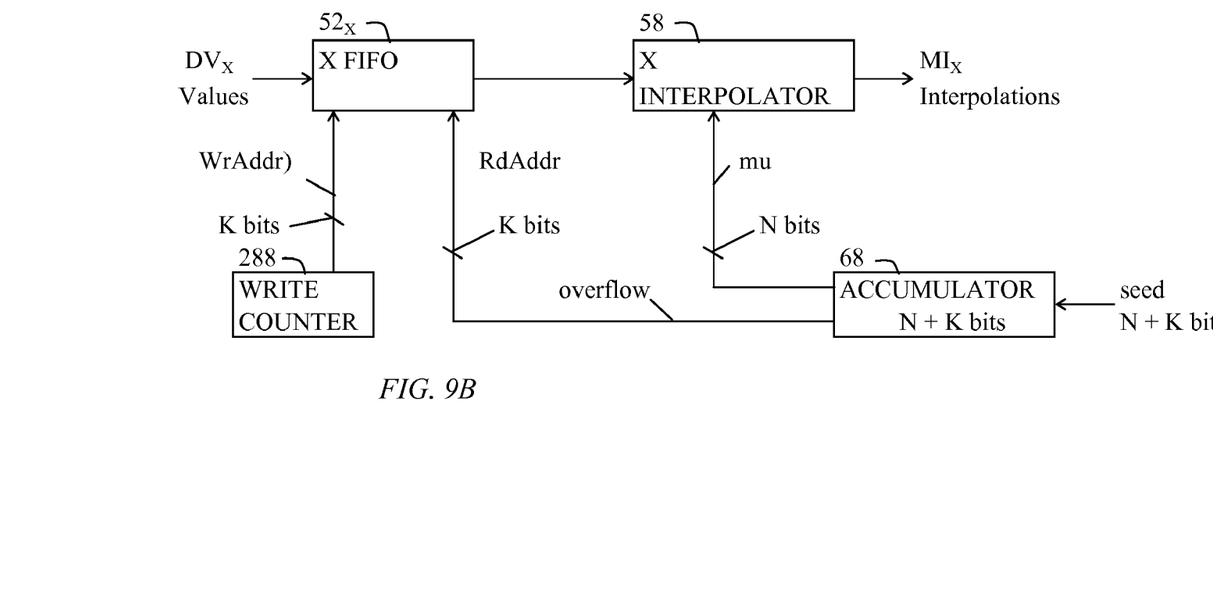

FIGS. 9A and 9B are block diagrams showing an example of the operation of the FIFO 52 for the interpolation synchronizer circuits 50 and 250. The X part of the FIFO 52 is referred to as FIFO 52$_X$. The X FIFO 52$_X$ is 2^K in length. The digital values $DV_X$ are written into the X FIFO 52$_X$ at addresses provided by a write counter 288 with an address word (WrAddr) length of K bits. The digital values $DV_X$ are read by the X interpolator 58 at overflows of the accumulator 68 at read address words (RdAddr) provided by a read counter 289 or as a part of an overflow word from the accumulator 68. The interpolation fraction mu generated by the accumulator 68 has length of N bits. Where the read counter 289 is used to generate the read address the accumulator 68 and the seed word have lengths of N bits. Where the overflow word is used to generate the read address the accumulator 68 and the seed word have N+K bits.

The reader may refer to the numerical example FIG. 3 and the flow charts of FIGS. 4-7 and accompanying written descriptions for additional details for the block diagrams of the FIGS. 1, 2, 8, and 9A-B; and conversely refer to the block diagrams of the FIGS. 1, 2, 8 and 9A-B, and numerical example FIG. 3 and accompanying written descriptions for additional details for the flow charts of FIGS. 4-7.

While this document contains many specifics, these should not be construed as limitations on the scope of any invention or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications and enhancements to the described examples and implementations and other implementations may be made based on what is disclosed and illustrated in this document.

What is claimed is:

1. An optical receiver for receiving an incoming optical signal carrying symbols, the optical receiver comprising:
   an analog-to-digital converter (ADC) operating at a fractional sampling clock rate to convert an analog signal carrying the symbols to digital ADC output samples;
   an interpolator to interpolate at an interpolation clock rate different than the fractional sampling clock rate between digital values derived from the digital ADC output samples to provide moving interpolations; and
   an interpolation feedback loop to synchronize the moving interpolations with the symbols, the interpolation feedback loop comprising
      a seed generator to compute seeds based in part on a ratio between the fractional sampling clock rate and the interpolation clock rate,
      an accumulator to provide interpolation fractions at the interpolation clock rate, the accumulator being configured to
         increment by the seeds to compute the interpolation fractions, and
         generate an overflow when an increment by a current one of the seeds causes a modulus of the accumulator to be exceeded,
   wherein the interpolator is configured to
      use the interpolation fractions to interpolate between the digital values to compute values of the moving interpolations,
      operate with the interpolation clock rate to respond to the overflow by reading a new one of the digital values, and
      use a current one of the interpolation fractions to interpolate between the new digital value and a previous one of the digital values when the accumulator generates the overflow or to interpolate by the current interpolation fraction between a previous one of the digital values and a second previous one of the digital values when the accumulator does not generate the overflow.

2. The optical receiver of claim 1, wherein the fractional sampling clock rate is configured to provide fewer than two of the digital ADC output samples for one of the symbols.

3. The optical receiver of claim 1, wherein
the interpolation clock rate is configured to operate at greater than two times an expected rate of the symbols, and
the feedback interpolation loop is configured to synchronize the moving interpolations to two of the moving interpolations for one of the symbols.

4. The optical receiver of claim 1, wherein
the interpolator is configured as a first polarization state interpolator to interpolate between the digital values corresponding to a first polarization of the optical signal to compute the moving interpolations for the first polarization, and
the optical receiver further comprises:
a second polarization interpolator configured to use the same interpolation fractions to interpolate between digital values corresponding to a second polarization of the optical signal to compute the moving interpolations for the second polarization; and
a data estimator to use the first and the second polarization moving interpolations to estimate data carried by the optical signal.

5. The optical receiver of claim 1, wherein the seed generator is configured to compute the seeds based in part on an overrate compensation to compensate for an expected offset between the interpolation clock rate and a selected multiple of a rate of the symbols.

6. The optical receiver of claim 1, wherein
the interpolation feedback loop includes
a timing error detector to determine timing errors between the moving interpolations and the symbols, and
the seed generator is configured to use the timing errors for computing the seeds.

7. The optical receiver of claim 1, wherein
the interpolation feedback loop includes
the interpolator to provide first moving interpolations to a data estimator,
a second stage interpolator to interpolate between the moving interpolations to provide second moving interpolations at a rate different than the first moving interpolations,
a timing error detector to determine timing errors between the second interpolations and the symbols, and
the seed generator to use the timing errors to generate the seeds to synchronize the moving interpolations to a rate different than the second interpolations.

8. The optical receiver of claim 1, further including:
a FIFO to provide the digital values to the interpolator; and
a clocking inhibitor to detect validity of the FIFO and to prevent the interpolator from providing the moving interpolations when the FIFO is not valid.

9. The optical receiver of claim 1, wherein
the fractional sampling clock rate is operated at a free running rate not synchronized to the symbols to provide the digital ADC output samples, and
the interpolation feedback loop is configured to provide the moving interpolations synchronized to two of the moving interpolations for one of the symbols.

10. A method for receiving an incoming optical signal carrying symbols, the method comprising:
converting an analog signal carrying the symbols to digital ADC output samples at a fractional sampling clock rate;
interpolating at an interpolation clock rate different than the fractional sampling clock rate between digital values derived from the digital ADC output samples to provide moving interpolations; and
synchronizing the moving interpolations with the symbols using feedback from the moving interpolations, said synchronizing comprising
generating seeds based in part on a ratio between the fractional sampling clock rate and the interpolation clock rate, and
providing interpolation fractions at the interpolation clock rate at least in part by
incrementing accumulations by the seeds for computing the interpolation fractions, and
generating an accumulation overflow when an increment by a current one of the seeds causes an accumulation modulus to be exceeded,
wherein said interpolating includes
using the interpolation fractions for interpolating between the digital values to compute values of the moving interpolations,
operating at the interpolation clock rate to respond to the overflow by reading a new one of the digital values,
interpolating with a current one of the interpolation fractions between the new digital value and a previous one of the digital signal values when the overflow is generated, and
interpolating with the current interpolation fraction between a previous one of the digital values and a second previous one of the digital values when the overflow is not generated.

11. The method of claim 10, wherein said converting the analog signal at the fraction sampling clock rate includes
issuing fewer than two of the digital ADC output samples for one of the symbols.

12. The method of claim 10, wherein said synchronizing includes
operating with an interpolation clock rate greater than two times an expected rate of the symbols, and
synchronizing the moving interpolations with the feedback to two of the moving interpolations for one of the symbols.

13. The method of claim 10, wherein
said interpolating at the interpolation clock rate includes
interpolating between the digital values corresponding to a first polarization of the optical signal to compute the moving interpolations for the first polarization, and
the method further comprises:
interpolating between digital values corresponding to a second polarization of the optical signal to compute the moving interpolations for the second polarization using the same the interpolation fractions; and
using the first and second polarization moving interpolations for estimating data carried by the optical signal.

14. The method of claim 10, wherein said generating the seeds includes
biasing the seeds with an overrate compensation to mitigate an expected offset between the interpolation clock rate and a selected multiple of a rate of the symbols.

15. The method of claim 10, wherein:
synchronizing includes determining timing errors between the moving interpolations and the symbols; and using the timing errors for generating the seeds.

16. The method of claim 10, wherein said synchronizing further includes
   interpolating between the moving interpolations to provide second interpolations,
   determining the timing errors between the second interpolations and the symbols, and
   using the timing errors to generate the seeds for synchronizing the moving interpolations to a rate different than the second interpolations.

17. The method of claim 10, further comprising:
providing the digital values from a FIFO; and
preventing the interpolating when the FIFO is determined to be not valid.

18. The method of claim 10, further comprising:
operating the fractional sampling clock rate at a free running rate not synchronized to the symbols to provide the digital ADC output samples; and
synchronizing the moving interpolations to two of the moving interpolations to one of the symbols.

* * * * *